3,573,199
ACIDITY CONTROL FOR A REFORMING PROCESS
Charles S. McCoy, Orinda, Calif., assignor to Chevron
Research Company, San Francisco, Calif.
No Drawing. Filed June 16, 1969, Ser. No. 833,781
Int. Cl. C10g 35/08
U.S. Cl. 208—139          6 Claims

ABSTRACT OF THE DISCLOSURE

The halide content of a platinum containing catalyst is adjusted during a reforming process without discontinuance of contact of the feed with the catalyst by (1) adjusting the temperature to within the range of 675 to 725° F.; (2) adjusting the water content in the reaction within the range of from 0.05 to 0.1 p.s.i.a.; and (3) then injecting halogen or compounds of halogen into the reaction zone to increase the halide content of the catalyst.

BACKGROUND OF THE INVENTION

Field

The present invention relates to the reforming of naphtha feedstocks in the presence of hydrogen with a platinum group component catalyst containing halide. In particular the present invention is concerned with controlling the halide content of the catalyst during the reforming process.

Prior art

Reforming of a naphtha fraction or feedstock is generally accomplished by contacting the naphtha in a reaction zone with a catalyst comprising a hydrogenation-dehydrogenation component associated with a porous solid carrier. Platinum on alumina is a principal catalyst for reforming. By an appropriate selection of operating conditions, the catalyst can be used for a number of months without regeneration. However, the activity of the catalyst gradually decreases with use due to several factors including deposition of carbonaceous matter on the catalyst, possible poisoning of the catalyst by traces of impurities in the feed, and loss of halide, particularly chloride, from the catalyst during the reforming process. As the activity of the catalyst declines, it is necessary to compensate therefor if a product of constant quality is desired.

U.S. Pat. 2,642,384 discloses a method for controlling the activity of a platinum-halide-alumina catalyst during a reforming process. Basically the process involves increasing the activity of the catalyst by the addition to the reaction zone while reforming of a minor amount of a halogen compound that is reactable with the alumina in the catalyst. U.S. Pat. 2,642,384 teaches adding the halogen compound to the reaction zone while reforming at a temperature of from 750 to 1000° F.

SUMMARY OF THE INVENTION

It has now been found that the acidity or activity of the catalyst can be beneficially controlled by properly adjusting the temperature and water content in the reaction zone before adding halogen or a compound of halogen to the reaction zone in contact with the catalyst. By using a selected temperature range and a selected water content, more uniform distribution of the halide throughout the catalyst can be obtained. Furthermore, for several reactors in series, proper allocation of acidity (halide) in the different reactors can be obtained.

Thus, in a reforming process wherein a naphtha feed is contacted in a reaction zone with a catalyst comprising a platinum group component and halide associated with a porous solid carrier at reforming conditions and in the presence of hydrogen to produce an effluent comprising gasoline of improved octane rating, the improved method for adjusting the acidity of the catalyst while continuing contact of the feed with the catalyst comprises: (1) adjusting the temperature in the reaction zone to within the range of from 675 to 725° F.; (2) adjusting the water content in the reaction zone to within the range of from 0.05 to 0.1 p.s.i.a.; and (3) then injecting halogen or a halogen compound into the reaction zone to increase the halide content of the catalyst.

DESCRIPTION OF THE INVENTION

Reforming of naphtha feedstocks is generally accomplished at a temperature within the range of from 600 to 1100° F., and preferably from 750 to 1050° F. At the lower temperatures, that is, temperatures below 750° F., the dehydrogenation reactions control. Hence at the low temperatures, very little hydrocracking, isomerization or dehydrocyclization occurs. At the low temperatures, however, even the dehydrogenation reaction rates are quite low, and hence very low space velocities must generally be employed to accomplish appreciable conversion. At temperatures in excess of 1100° F., a significant amount of thermal reaction takes place accompanied by a poor liquid recovery and rapid catalyst deactivation.

The pressure used in reforming can be atmospheric or superatmospheric. However the pressure will in general fall within the range of from 25 to 1000 p.s.i.g. and preferably from 50 to 750 p.s.i.g.

The reforming conditions will depend in large measure on the feed used, whether highly aromatic, paraffinic and naphthenic and upon the desired octane rating of the product. The temperature and pressure can be correlated with the liquid hourly space velocity (LHSV) to favor any particularly desirable reforming reaction as, for example, aromatization or isomerization or dehydrogenation. In general, the liquid hourly space velocity will be from 0.1 to 10 and preferably from 1 to 5.

The reforming process is conducted in the presence of hydrogen. Hydrogen may be introduced from an extraneous source, e.g., pure hydrogen from bottles may be used. Thus, the hydrogen may be used only on a once-through basis. Inasmuch as reforming generally results in the production of hydrogen, hydrogen produced in the reaction may be separated from the reformate and recycled to the reaction zone. Thus, extraneous hydrogen need not necessarily be added to the reforming process. However, if desired, extraneous hydrogen may be used at some stage of the operation, as, for example, during startup. Regardless of the source of the hydrogen, the hydrogen can be introduced into the feed prior to contact with the catalyst or can be contacted simultaneously with the introduction of feed to the reaction zone. The hydrogen need not necessarily be pure hydrogen, but may contain light hydrogen gases in admixture therewith. Generally, when hydrogen is recirculated to the reaction zone, light hydrocarbon gases will be recirculated with the hydrogen. It is preferred that relatively pure hydrogen be used; however, difficulty and expense in purifying recycle hydrogen often prevents this from being the case. Hydrogen is preferably introduced into the reforming reactor at a rate which varies from 0.5 to 20 moles of hydrogen per mole of feed.

The naphtha feedstock used in reforming generally boils within the range from 70 to 550° F. and preferably from 150 to 450° F. The feedstocks can be, for example, a straight-run or a thermally cracked naphtha or a catalytically cracked naphtha or blends thereof. It is generally preferred that the feed be low in impurities, for example, nitrogen and sulfur. Thus, generally the feeds should preferably contain less than 1 p.p.m. nitrogen and preferably less than 10 p.p.m. sulfur and more preferably, less than 5 p.p.m. sulfur. The detrimental effect of sulfur is particularly evident when using a catalyst comprising platinum and rhenium in associated with a porous solid support.

The hydrocarbons may be reformed using fluidized bed, moving bed or fixed bed types of processes. Fixed bed processes are particularly desirable because operations of this type tend to minimize the attrition losses of the catalyst. The present invention is particularly useful in those reforming systems wherein a plurality of reaction zones in series are used, each reaction zone containing a fixed bed of catalyst comprising a platinum group component-halide-containing catalyst. The hydrocarbon feed is preheated and mixed with hydrogen and then passed through the plurality of reaction zones containing catalyst. Generally, in all but the last stages the reactions are endothermic; hence, the hydrocarbon feed passing between the reaction zones is reheated to the desired conversion temperature. Reformed hydrocarbons are recovered and hydrogen is separated therefrom and recycled to the reaction zone.

The catalyst which finds use in reforming comprises a platinum group component and halide associated with a porous solid carrier. Preferably the catalyst comprises a platinum group component, e.g., platinum, palladium, iridium, ruthenium, etc., supported with a porous inorganic oxide as, for example, alumina. The platinum group component will be present in an amount of from 0.01 to 3 weight percent and preferably 0.01 to 1 weight percent. The weight percent of a platinum group component is calculated as the metal regardless of the form in which it exists on the catalyst. The platinum group component embraces all the members of Group VIII of the Periodic Table having an atomic weight greater than 100 as well as compounds and mixtures of any of these. Platinum is the preferred component because of its better reforming activity.

Porous solid carriers which find particular use for reforming are generally the inorganic oxides, particularly inorganic oxides having surface areas of 50 to 750 m.$^2$/gm., preferably 150 to 750 m.$^2$/gm. The carrier can be a natural or a synthetically-produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia, and crystalline zeolite aluminosilicates.

It is generally preferred that the catalysts have low cracking activity, that is, have limited acidity. Thus, it is particularly preferred that alumina be present. Any of the forms of alumina suitable as a support for reforming catalysts can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

Other components in addition to the platinum group component can be present with the porous solid carrier. It is particularly preferred that rhenium be present, for example, in an amount of from 0.01 to 5 weight percent and more preferably 0.01 to 2 weight percent. Regardless of the form in which rhenium exists on the catalyst, whether as metal or compound, the weight percent is calculated as the metal. Rhenium significantly improves the yield stability of the platinum-containing catalyst, that is, a process using a platinum-rhenium catalyst has a significantly lower yield decline throughout the reforming process than a catalyst comprising platinum without rhenium. The platinum-rhenium catalyst is more fully described in U.S. Pat. 3,415,737, which is incorporated herein by reference thereto.

The catalyst comprising the platinum group component can be prepared in a variety of methods; that is, the platinum group component can be associated with the porous solid carrier by impregnation, ion-exchange, coprecipitation, etc. Generally it is preferred to incorporate the platinum group component by impregnation. When rhenium is incorporated along with the platinum group component, the rhenium component can also be associated with the carrier by various techniques, e.g., impregnation, ion-exchange, coprecipitation, etc. Preferably, the platinum group component and rhenium component are associated with the carrier by impregnation, either simultaneously or sequentially. Particularly preferred platinum group compounds for use in impregnation include chloroplatinic acid, ammonium chloroplatinates, polyammineplatinum salts, palladium chloride, etc. Suitable rhenium components are perrhenic acid, ammonium or potassium perrhenates, etc.

The catalyst used in reforming will be promoted by the addition of halides, particularly fluoride or chloride. Bromides may also be used. The halides provide a limited amount of acidity to the catalyst which is beneficial to most reforming operations. A catalyst promoted with halide preferably contains from 0.1 to 3 weight percent total halide content. Halides can be incorporated onto the catalyst carrier at any suitable stage of catalyst manufacture, e.g., prior to or following incorporation of the platinum group component and/or the rhenium component. Halide can also be incorporated onto the catalyst during incorporation of the platinum group component or rhenium component.

As indicated previously the activity of the catalyst gradually decreases throughout the reforming process. As the activity decreases, it is generally necessary to compensate therefor. The decrease in activity of the catalyst can be monitored by the increase in temperature necessary to maintain conversion of the naphtha to a constant octane product. In particularly, when the decrease in the activity is due to the loss of halide on the catalyst, it is necessary to add additional halide. The halide content of the catalyst is desirably monitored by the means of catalyst samplers, e.g., as disclosed in U.S. Pats. 3,129,590 and 3,319,469. By the means of catalyst samplers, small amounts of catalyst can be removed from the reactor without involving shutdown of the reactor or disruption of the normal reforming process. The catalyst samples removed can then be analyzed for chloride by standard procedures.

The present process for adjusting the halide content of the catalyst, i.e., increasing the halide content from a previously measured value to the desired new value, involves adjusting the temperature in the reaction zone to within the range of from 675 to 725° F. and then adjusting the water content of the reaction zone to within the range of 0.05 to 0.1 p.s.i.a. and finally injecting halogen or halogen compound into the reaction zone to increase the halide content of the catalyst. The feed and hydrogen are continued in contact with the catalyst throughout the acidity or halide adjustment. In general, the temperature will be decreased from a value well above 750° F., for example, 900 to 1000° F., to a temperature where the primary reactions are dehydrogenation reactions and which dehydrogenation reactions proceed at a very slow rate. At the low temperature range, i.e., 675 to 725° F., the reforming reaction will almost stop; the reactor outlet temperatures will be close to the inlet temperatures. Thus, a minimum temperature change, $\Delta T$, will exist throughout the catalyst bed. This is desirable in that more uniform distribution of the halogen or halogen compound over the catalyst is obtained when the catalyst bed is substantially at a constant temperature. It is important that the temperature be maintained from 675 to 725° F. during the period of time when halogen or halogen compound is added since adsorption of the halogen or halogen compound is greater at the low temperatures. Too low of temperatures, i.e., below 675° F., are not desirable since halogen or halogen compounds cannot be converted or are only slowly converted in the presence of hydrogen to compounds which adequately adsorb on the catalyst. Also, the temperature is maintained above about 675° F. to insure hydrogen production, preferably for recycle to the reaction zone. Temperatures above 725° F. are not desirable when adding halogen or halogen compounds inasmuch as near isothermal conditions do not generally prevail in the reaction zone and thus the affinity of the halogen or halogen compound for the catalyst will vary depending on the position of the catalyst in the reactor bed.

The water partial pressure in the reaction zone should be within the range of from 0.05 to 0.1 p.s.i.a. during the time that the temperature is at a reduced level and during the time halogen or halogen compound is added. Reforming processes are generally conducted at a low water partial pressure, e.g., in the range of from 0.01 to 0.03 p.s.i.a.; the small amount of water helps activate the acidic functions of the catalyst. The exact amount of water used in reforming processes is usually correlated with the amount of halide on the catalyst so that the proper ratio of hydrocracking to aromatization is accomplished. When adjusting the halide content of the catalyst by the process of the present invention, the water partial pressure will generally need to be increased from a low value of 0.01 to 0.03 p.s.i.a. to a higher value within the range of from 0.05 to 0.1 p.s.i.a. The relatively high water partial pressure helps increase the uniformity of halide addition to the catalyst. The water tends to move halogen or halogen compounds through the reactor bed.

In the operation of the present process, water or steam can be added in the required amounts to the naphtha feed or the water or steam can be added directly to the reaction zone. If desired, compounds that liberate water under the conditions prevailing in the reaction zone can be used in place of water. Thus, oxygenated hydrocarbons, e.g., alcohols such as tributyl alcohols, peroxides, hydroperoxides and phenols, may be used. In general, water is preferred because of its low cost and because the use thereof does not introduce contaminating organic radicals into the mixture. In order to achieve accurate control on the amount of water present in the reaction zone, it may be necessary to use naphtha feed which has been prefractionated to remove dissolved water, oxygen and oxygenated compounds thereof, and thereafter add to the fractionated charge stock the desired amount of water for the reaction zone. If this procedure is followed, the partial pressure of water in the reaction zone can be regulated since it cannot be influenced by the varying amounts of water and like in the naphtha feed. Rather than fractionate, it may also be desired in some cases to remove water, oxygen, and oxygenated compounds from the naphtha by passing the naphtha at an elevated temperature through a bed of molecular sieves or activated alumina or similar desiccant.

In most processes the effluent from the reaction zone is treated, e.g., in a separator-fractionator to obtain a reformate of improved octane and a hydrogen-rich stream, which hydrogen-rich stream is then recycled after proper purification to the reaction zone. In such systems the water content in the reaction zone can be monitored by following the water content of the hydrogen recycle stream. Apparatus are commercially available for monitoring water in hydrogen recycle streams. Thus, in a reforming process with a hydrogen recycle stream and using relatively water-free and oxygen-free naphtha, it may be desirable to operate the process with a water content in the recycle stream of from 10 to 50 p.p.m., by weight, based on the recycle stream, and then to raise the water content of the recycle stream to from 70 to 100 p.p.m. when adjusting the acidity of the catalyst by the present process.

When the temperature in the reaction zone is within the range of 675 to 725° F. and the water content is in the range of from 0.05 to 0.1 p.s.i.a., a halogen or compound of halogen can be added to the reaction zone to increase the halide content of the catalyst. The halogen or halogen compound can be added in only a sufficient amount to restore the halide content of the catalyst to the value of fresh catalyst or can be added in sufficient amount to increase the halide content of the catalyst over that of fresh catalyst. The halogen or compound of halogen can be added to the naphtha feedstock prior to introduction into the reaction zone or can be added separately to the reaction zone.

Halogen, e.g., chlorine, fluorine or bromine, can be suitably used to adjust the acidity of the catalyst. Alternately, halogen compounds can be used, for example, hydrogen chloride, ammonium chloride, monochloro acetic acid, trichloro acetic acid, carbon tetrachloride, chloroform, tertiary butyl chloride, hydrogen fluoride, cyclohexo fluoride, isopropyl fluoride, tertiary butyl fluoride, hydrogen bromide, and di-chloro di-fluoromethane. Chloride compounds are particularly beneficial. Propylene dichloride is a preferred compound to use. These compounds are not necessarily equivalent in their effect upon the catalyst. A given amount of one compound often will increase the activity considerably more than a given amount of another compound. In addition, some of the compounds are completely adsorbed or reacted with the catalyst during passage through the reaction zone; whereas when other compounds are employed, only a portion is adsorbed or reacted with the catalyst. The halogen or halogen compound thus added to the charge may be the same as the halide on the catalyst. However, this is not necessary since good results are obtained when the halogens are dissimilar.

Following proper adjustment of the acidity of the catalyst by addition of the halogen or halogen compound, the water content can be descreased, if desired, to a value more proper for reforming and the temperature increased to a range where reforming reactions other than just dehydogenation occur to a significant extent. Normal reforming is then possible. The frequency at which the activity of the catalyst must be adjusted according to the process of the present invention will depend on many factors including the frequency of water upsets in the reforming process, that is, the frequency at which an excessive amount of water may occur in the naphtha feed or in the reaction zone which could strip halide from the catalyst. Also, other factors are important such as the rate of deactivation of the catalyst as a result of different type feedstocks or poisons in the feed, etc.

The process of the present invention is particularly valuable when operating with a plurality of reactors in a series. Generally, halogen containing material is added to each separate reactor. This permits controlled addition to attain the desired halide profile in the several reactors. Further, any halide not absorbed in a reactor will migrate to downstream reactors, thus increasing the halide content of the second, third, etc. reactors. The terminal reactor in the series will thus contain more halide than the first reactor. Thus, the process of the present invention accentuates a desired uphill halide profile of the catalyst in the several reactors. It is desirable to have more halide on the catalyst in the terminal reactor inasmuch as dehydrocyclization or hydrocracking reactions, which reactions are favored by more acid catalysts, are the primary reactions in the terminal reactor.

The foregoing disclosure of this invention is not to be considered as limiting since many variations can be made by those skilled in the art without departing from the scope or spirit of the appended claims.

I claim:

1. In a reforming process wherein a naphtha feed is contacted in a reaction zone with a catalyst comprising a platinum group component associated with a porous solid carrier at reforming conditions including a temperature of from 750 to 1100° F. in the presence of hydrogen to produce a high octane gasoline product, the improvement for adjusting the acidity of the catalyst while continuing the contact of the feed with the catalyst which comprises: (1) reducing the temperature in the reaction zone to within the range of from 675 to 725° F., (2) adjusting the water content in the reaction zone to within the range of from 0.05 to 0.1 p.s.i.a., and (3) then injecting halogen or a compound of halogen into the reaction zone to increase the halide content of the catalyst.

2. The process of claim 1 wherein the catalyst comprises platinum in association with alumina.

3. The process of claim 1 wherein the catalyst comprises rhenium.

4. The process of claim 1 wherein the catalyst comprises platinum in an amount from 0.01 to 3 weight percent and rhenium in an amount from 0.01 to 5 weight percent and halide in an amount from 0.1 to 3 weight percent in association with alumina.

5. The process of claim 1 wherein the catalyst is present in a plurality of reactors provided for serial flow of naphtha therethrough and halogen or a compound of halogen is injected into contact with the catalyst in each reactor.

6. In a reforming process wherein the naphtha feed is contacted in a reaction zone with a catalyst comprising 0.01 to 3 weight percent platinum associated with alumina and initially containing from 0.1 to 3 weight percent chloride at reforming conditions including a temperature of from 750 to 1050° F. and a water partial pressure of from 0.01 to 0.03 p.s.i.a. and in the presence of hydrogen to produce a high octane gasoline product, the improvement for adjusting the acidity of the catalyst during the reforming process which comprises: (1) reducing the temperature in the reaction zone to within the range of from 675 to 725° F., (2) increasing the water content in the reaction zone to within a range of from 0.05 to 0.1 p.s.i.a., and (3) then adding chloride or a compound of chloride into the reaction zone to increase the chloride content of the catalyst.

References Cited

UNITED STATES PATENTS

| | | | |
|---|---|---|---|
| 2,642,384 | 6/1953 | Cox | 208—139 |
| 2,899,378 | 8/1959 | Herder | 208—139 |
| 2,911,358 | 11/1959 | Leigh et al. | 208—139 |
| 2,916,440 | 12/1959 | Hogin et al. | 208—139 |
| 2,969,319 | 1/1961 | Sosnowski et al. | 208—139 |
| 2,981,694 | 4/1961 | Engel | 208—139 |
| 3,030,301 | 4/1962 | White et al. | 208—139 |
| 3,041,272 | 6/1962 | Burk et al. | 208—139 |
| 3,287,253 | 11/1966 | McHenry et al. | 208—139 |
| 3,407,135 | 10/1968 | Brown | 208—139 |

HERBERT LEVINE, Primary Examiner

U.S. Cl. X.R.

208—65